US007845901B2

(12) United States Patent
Aubin et al.

(10) Patent No.: US 7,845,901 B2
(45) Date of Patent: Dec. 7, 2010

(54) AIR BLEED DEVICE ON A MACHINE STATOR PIVOTING BLADE

(75) Inventors: Stephan Yves Aubin, Fontainebleau (FR); Thomas Julien Roland Earith, Veneux les Sablons (FR); Didier Rene Andre Escure, Nandy (FR); Thierry Jean-Jacques Obrecht, Melun (FR); Stephane Rousselin, Hericy (FR)

(73) Assignee: SNECMA, Paris (FR)

( * ) Notice: Subject to any disclaimer, the term of this patent is extended or adjusted under 35 U.S.C. 154(b) by 1275 days.

(21) Appl. No.: 11/330,371

(22) Filed: Jan. 12, 2006

(65) Prior Publication Data

US 2006/0174632 A1   Aug. 10, 2006

(30) Foreign Application Priority Data

Jan. 14, 2005   (FR) .................................. 05 50123

(51) Int. Cl.
*F01D 17/16* (2006.01)
(52) U.S. Cl. ........................ 415/144; 415/115; 415/160; 415/914; 285/226; 285/229; 285/272; 285/354
(58) Field of Classification Search ................. 415/115, 415/144–145, 159–162, 914; 285/226, 229, 285/272, 354
See application file for complete search history.

(56) References Cited

U.S. PATENT DOCUMENTS

| 841,059 | A | * | 1/1907 | Shutt ........................... 285/354 |
| 2,014,355 | A | * | 9/1935 | Hussman ...................... 285/226 |
| 2,720,356 | A | | 10/1955 | Erwin |
| 2,981,066 | A | * | 4/1961 | Johnson ....................... 415/115 |
| 3,747,960 | A | * | 7/1973 | Bawa .......................... 285/354 |
| 3,862,747 | A | * | 1/1975 | Richter ....................... 415/115 |
| 5,472,314 | A | | 12/1995 | Delonge et al. |
| 5,517,817 | A | | 5/1996 | Hines |
| 5,795,128 | A | | 8/1998 | Eichstadt |
| 5,857,716 | A | * | 1/1999 | Thomas ....................... 285/354 |
| 5,941,537 | A | | 8/1999 | Wallace et al. |
| 2007/0063512 | A1 | * | 3/2007 | Tamez ......................... 285/354 |

FOREIGN PATENT DOCUMENTS

| FR | 2 433 106 | | 3/1980 |
| GB | 2027811 | A * | 2/1980 |

* cited by examiner

*Primary Examiner*—Christopher Verdier
(74) *Attorney, Agent, or Firm*—Oblon, Spivak, McClelland, Maier & Neustadt, L.L.P.

(57) ABSTRACT

Devices for intaking gases from the boundary layer through ducts hollowed out in blades. These devices are suitable for variable setting blades, installed on the stator using pivots. The seal is maintained despite the variation in the relative position between the moving pivots through which ducts pass, and the fixed intake header pipe.

3 Claims, 4 Drawing Sheets

AIR BLEED DEVICE ON A MACHINE STATOR PIVOTING BLADE

BACKGROUND OF THE INVENTION

1. Field of the Invention

The subject of this invention is air bleed on a pivoting blade of a turbomachine stator.

2. Discussion of Background

A large number of turbomachines include stator blades with a pivoting assembly so as to modify the gas guiding characteristics depending on the speed of the machine. Specialists say that the blade setting is variable. The blade setting is varied by a throttle control surrounding the stator and usually including an actuation ring to which connecting rods are articulated, the opposite ends of the connecting rods engaging with extreme portions of pivots of blades that extend outside the stator. Rotation of the ring around the stator tilts the connecting rods and pivots the blades about the pivot axis.

It is also known that gases can be taken in on the surface of the blades. Such an arrangement is normally applied to compressor blades to suck in the boundary layer and consequently increase the compression ratio. Intake takes place through hollow channels formed in the blades and opening up on their surface, and air is recovered and reinjected into another portion of the machine. Although this process has been known for several decades, it has been suggested particularly for fixed setting blades that can be used to build intake ducts that are also fixed. This description discloses satisfactory solutions to the seal problem that arises when an intake system is applied to variable setting blades, necessarily adjusted with a clearance through the stator case.

However, we will mention document U.S. Pat. No. 5,795, 128 in which pivoting blades are provided with an air intake system including a header pipe covering the outside ends of the pivots and in which the hollow intake drillings drilled at the centre of the pivots open up. This design imposes a header pipe applied to the stator at the blades, which is a design constraint that cannot always be respected. One disadvantage of this design is due to the control rods that pass through the header pipe and require a particular sealing means.

Document FR-A-2 433 106 discloses a similar system except that the header pipe is made in the case in front of the central portions of the blade pivots. The hindrance associated with interference between the control rods and the header pipe disappears, but layout constraints are even greater. The airflow is affected by sudden direction and section variations that induce large head losses.

Document U.S. Pat. No. 5,472,314 describes a system in which the blade includes a pivoting part at the leading edge, a fixed part at the trailing edge, and an intermediate flexible part; air passes through the fixed part and the flexible part between the outside of the case and the pivoting part. This innovative design is expensive and complicated.

SUMMARY OF THE INVENTION

Thus, the invention relates to a device comprising a stator blade stage with variable setting, the blades each being fitted with a pivot passing through the stator and including an end portion extending outside the stator, characterised in that it includes an air bleed system comprising a header pipe surrounding the stator, connections to the header pipe prolonging the corresponding end portions of the pivots in a leaktight manner, and ducts hollowed out in the pivots and the faces of the blades.

The arrangement of connections to the header pipe prolonging the end portions of the pivots by spreading around them, results in the channels hollowed out in the pivots and passing through the stator opening up directly into the connections to the header pipe with no discontinuity or flow head loss. Seals arranged between the connections and the pivots reduce leaks to a low flow.

The design of the blades and the entire device remains simple, and the header pipe may be placed at any location at which it does not cause a hindrance, adjacent to or around the blade pivots.

However, it is important to be sure that junctions between connections to the header pipe and the end portions of the pivots do not hinder pivoting of the blades or cause excessive wear that would unacceptably increase leaks. In a first embodiment of the invention, connections to the header pipe include flexible pipes. One particularly simple means of connection to the blade pivots consists of arranging nuts free to rotate about the end of the pipe and connected to the ends of the pipe through stops, the end portions of the pivots being threaded to hold the connection nuts. All that is necessary then is to screw the nuts to the ends of the pivots to tighten the ends of the pipes in contact with the pivot end faces, the seals being arranged judiciously at the junctions. The threads may be the same as those used to install stop nuts in contact with the stator and that retain blade pivots preventing them from sliding in their housing.

One possible embodiment with strong pipes in such an application consists of making them from a metallic braid provided with an inside coating of a polymer such as tetrafluoroethylene (Teflon). This solves the problem of making a sealed mechanical connection between a fixed header pipe and mobile pivots placed at any position with respect to the header pipe.

The seal can be completed if the pipes are provided with sealing bellows penetrating the ducts hollowed out in the pivots. The bellows conceal the junctions between the pivots and the flexible pipes and reinforce the effectiveness of the seals.

In another embodiment, flexible pipes are no longer used. The connections of blade pivots to the header pipe are then made by tubular parts, in this case called rigid barrels, prolonging the pivots and fixed to the header pipe. This design supports the header pipe by blade pivots by means of rigid barrels, possibly without needing to use any other means of connecting the header pipe to the case. The header pipe at a distance from the case does not hinder the layout of the case. In one particular design, the assembly is possible if the header pipe and the connections are composed of two halves assembled at a joint, extending in the plane or in the cone of the blade pivoting axes.

In one particular design, the connections include sockets composed of two discontinuous halves surrounding the end portions of the pivots. The pivots are then tightly adjusted, with moderate clamping so as not to make pivoting more difficult.

In another embodiment in which the connections always include rigid barrels fixed to the header pipe, there are also prolonging pivots prolonging the blade pivots, in which ducts are hollowed out prolonging the ducts of blade pivots, rotational drive means connecting the prolonging pivots to the blade pivots, and bearings and seals between the barrels and the prolonging pivots. This more complicated construction has the advantage that it gives a better seal due to a greater assembly precision. The prolonging pivots may include axial support shoulders stopping in contact on the barrels, the header pipe then being composed of two concentric assembled parts. Greater cohesion of the device is then possible.

BRIEF DESCRIPTION OF THE DRAWINGS

The invention will now be described with reference to the following figures.

DETAILED DESCRIPTION OF THE PREFERRED EMBODIMENTS

Figure 1:
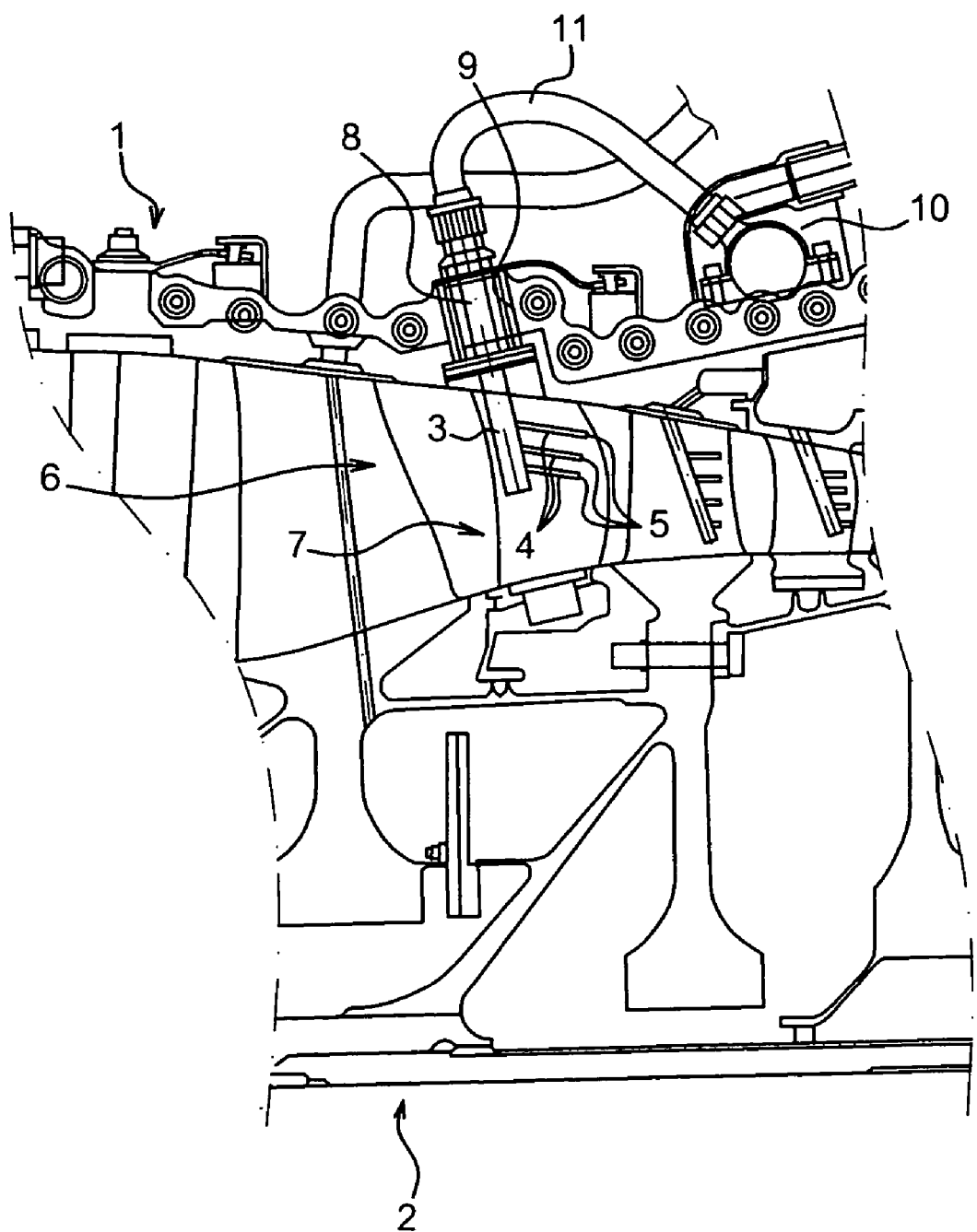
FIG. 1 is a general view of a device according to the invention.

FIG. 1 contains a partial view of a turbomachine in which the annular gas flow path delimited by a stator 1 and a concentric rotor 2, is occupied alternately by fixed blade stages connected to the stator 1, and the mobile blade stages connected to the stator 2. Some blade stages, for example belonging to the high pressure compressor, are hollowed out from intake ducts, the general shape of which may be compared to a comb and that include a main intake duct 3, hollowed out in the blade approximately in the radial direction, and affluents 4 hollowed out in the blade substantially in the axial direction and that open up at its surface at an intake point 5. The main ducts 3 open up in front of intake systems, most of which will not be described in detail, and are included inside the rotor 2 or the stator 1 depending on the case. In this case the description will apply to a particular stage 6 of fixed blades, in which the setting of the blades 7 is variable and pivots 8 passing through the stator 1 and that are connected to it by bearings 9. The main ducts of the blades 7 pass through the pivots 8. A circular header pipe 10 draws in air sucked in at the outside face of the stator 1, through connections 11 that are connected to the ends of the main ducts 3 respectively on the end portions of the pivots 8.

Figure 2:
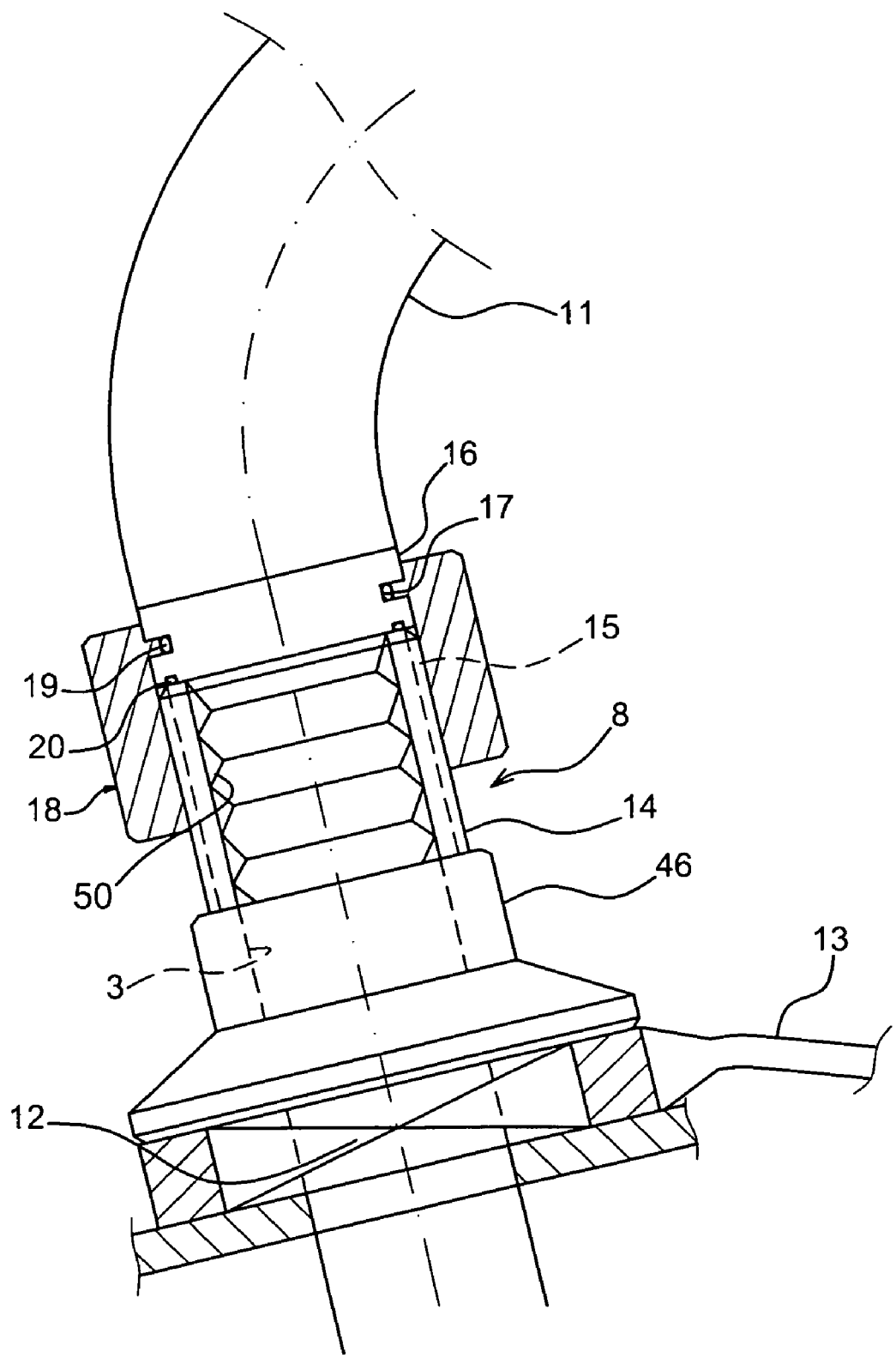
FIG. 2 is a view of the most innovative portions of the device.

FIG. 2 shows the layout at this location. The pivots 8 are provided with connection portions 12 usually with a square section outside the stator 1, control rods 13 controlling the setting of the blades 7 (that are only shown roughly) and threaded parts 14 on which nuts 46 are engaged retaining the pivots 8 preventing them from sliding in their bearings 9. Rotation retainers, not shown here, hold the nuts 46 at fixed positions on the threaded portions 14. According to the invention, the pivots 8 are prolonged towards the outside of the end portions 15 that make a junction with the connections 11. In this embodiment, these connections are flexible pipes for which the connection ends each carry a ring 16 in which a groove 17 is hollowed out. Nuts 18 have interfaces fitted with collars 19 retained in grooves 17 and enabling free rotation of the nuts 18 around the ends of the connections 11. The junctions are made by screwing the nuts 18 onto the threaded end portions 15 of the pivots 8 until the plane end faces of the connections 11 and pivots 8 touch each other through seals 20. The main channels 3 then open up in the connections 11. The seal is beneficially completed by bellows 50 engaged in the ends of the main ducts 3 and for which the outside folds touch their walls so as to limit the airflow reaching the seals 20. It has been found that the connections 11, that are fairly flexible in torsion and resistant to mechanical fatigue produced by pivoting of blades 7, and the heat of the bleed air, were obtained by constructing them from a metallic braid coated on the inside with a polymer such as tetrafluoroethylene. The bellows 50 can also be composed of tetrafluoroethylene.

Figure 3:
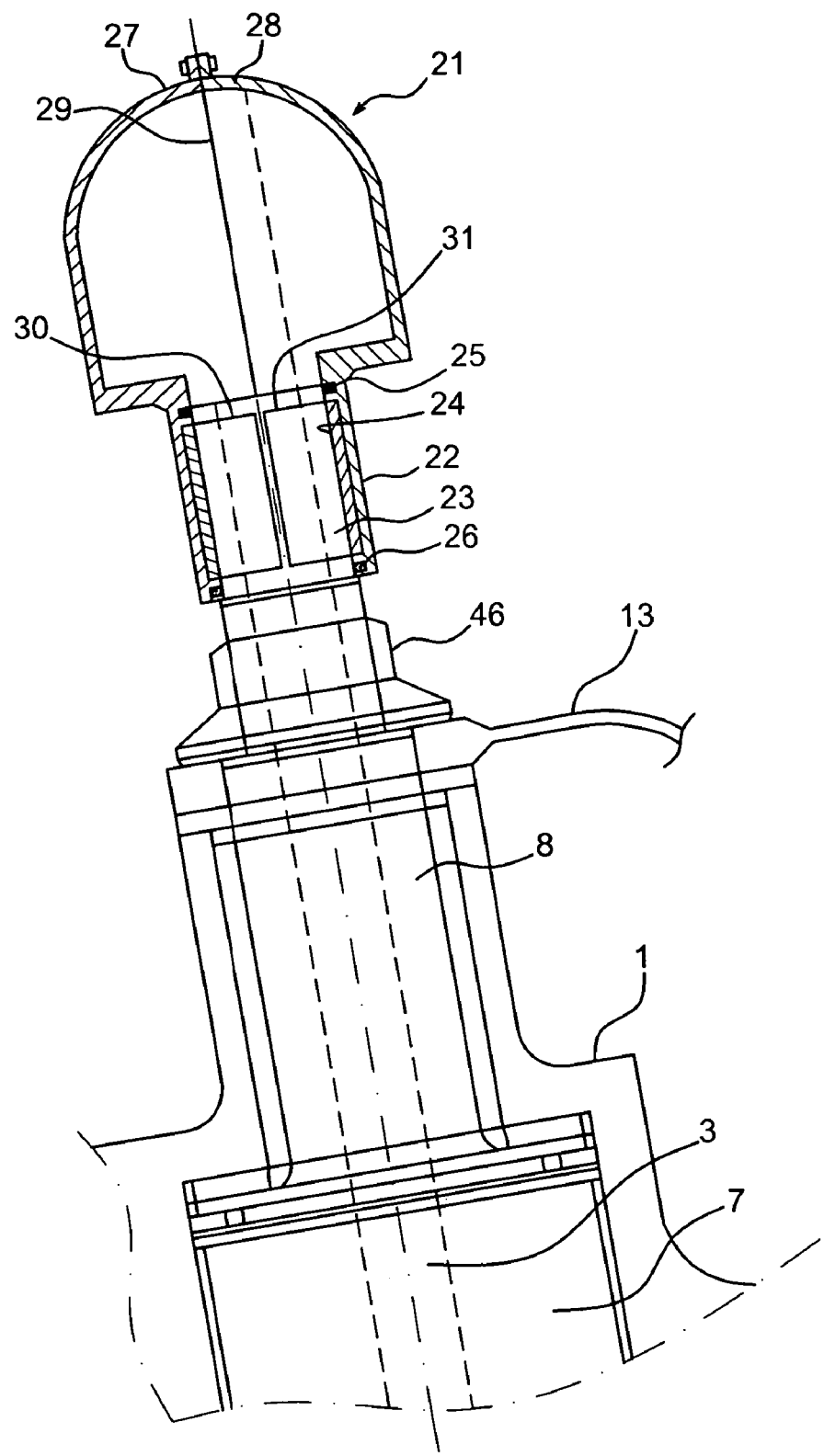
FIGS. 3 and 4 show two other possible embodiments of the invention.

A slightly different design is shown in FIG. 3. It is distinguished from the previous design particularly by the absence of a flexible pipe to make the connections to the header pipe. Furthermore, the header pipe bolted to the stator is replaced by a header pipe 21 extending along the prolongation of the axes of the pivots 8. The header pipe 21 is fixed to the tubular shaped barrels 22 directed towards the pivots 8 and that surround their end portions 23. The bond is completed by bushings 24 retained in grooves hollowed out in the inside face of the barrels 22 and acting as bearings between the barrels 22 and the end portions 23. Seals 25 and 26 arranged at the two ends of the bushings 24 held in place in other grooves of the barrels 22 and in friction on the end portions 23, improve the seal of the device. The main ducts 3 open up almost directly into the header pipe 21. One advantage of this design is that it eliminates the need for flexible connections 11 that are fragile elements of the intake device and occupy a fairly large volume on the surface of the stator 1. Finally, the header pipe 21 is not retained by the stator 1 but by the pivots 8. An easy and sufficiently rigid assembly is possible if the header pipe 21 and the barrels 22 are composed of two halves 27 and 28 that are substantially symmetric and are assembled to each other by a seal 29 passing through the plane or the cone of the rotation axes of the pivots 8. The assembly is made through flanges 29 and 30 produced on the outside and inside edges of the halves 27 and 28. The seal 29 is restored by the addition of a hardening material. Furthermore, the bushings 24 are also formed from two separate halves 30 and 31 for which the limits are close to the seal 29. When the header pipe 21 and the barrels 22 are assembled, the halves 30 and 31 of the bushings 24 are brought towards each other and apply a fairly tight fit onto the end portions 23 of the pivots 8, which produces good cohesion of the device without genuinely opposing rotation of the pivots 8. This device is suitable, regardless of whether or not the end portions 23 of the pivots 8 are threaded. Although this embodiment of the device is very simple and compact, its seal is not as good.

Figure 4:
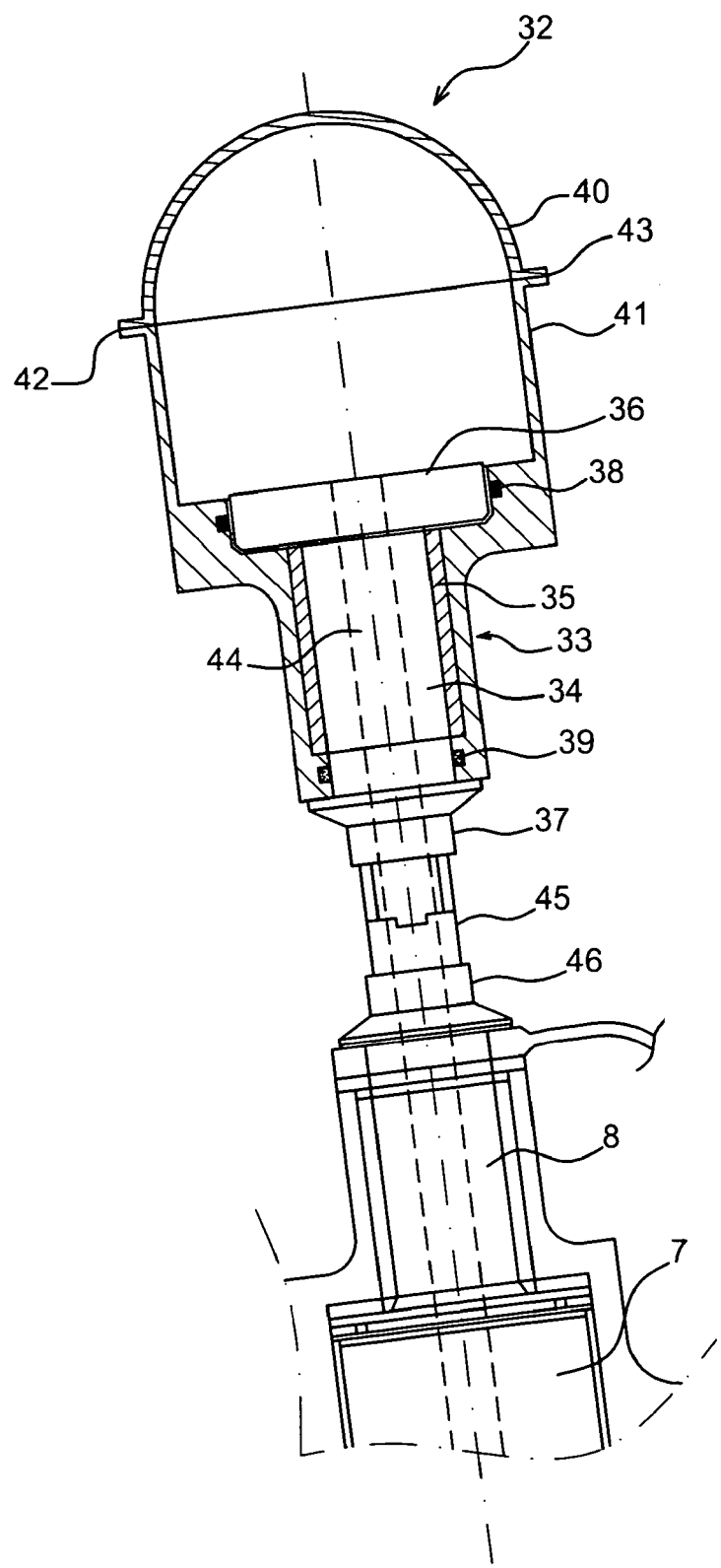

One possible improvement to this type of embodiment is shown in FIG. 4. The shape of the header pipe 32 for this embodiment is similar to the shape of the header pipe 21, but its composition is slightly different as will be seen later. It also includes barrels 33 similar to the barrels 22 but with an individual structure. One essential difference is that the barrels 33 contain prolonging pivots 34 that rotate in them about bearings 35 and are held in place by shoulders 36 at the ends arranged on the side of the header pipe 32 and by nuts 37 adjacent to the pivots 8, something like the pivots 8 installed on the stator 1. The pivots 8 and the prolonging pivots 34 are aligned and installed one on the other, the prolonging pivots 34 being adjusted around the end portions of the pivots 8. Central channels 44 passing through the prolonging pivots 34 prolong the ducts 3 of the pivots 8 of the blades 7 and open up into the header pipe 32. The prolonging pivots 34 are driven in rotation by the pivots 8 through notches 45 that bring them together. Since the bushings 35 and the barrels 22 are individual, the seal is much better if seals 38 and 39 are placed on each side of the bushings 35, similar to the previous embodiment. The header pipe 32 remains composed of two portions 40 and 41 assembled together by opposite flanges 42 and 43, but the seal is perpendicular to the rotation axes of the pivots 8, one of the portions 40 is an external portion and the other portion 41 is an internal portion comprising barrels 33, and flanges 42 and 43 are arranged on the side faces of the header pipe 32.

The invention claimed is:

1. A device comprising:
a stage of stator blades with variable setting, the blades each being fitted with a pivot passing through a stator and including an end portion extending outside the stator, said stage including an air bleed system comprising a header pipe surrounding the stator, connections to the header pipe prolonging the corresponding end portions of the pivots in a leaktight manner, and ducts hollowed out in the pivots and the faces of the blades,
wherein said connections to the header pipe include flexible pipes and nuts (18) free to rotate about the ends of the pipes and connected to said ends of the pipes through axial stops, the end portions of the pivots are threaded to hold the connection nuts and nuts for assembling blades on the stator, and seals are arranged between the ends of the flexible pipes and the pivots.

2. The device according to claim 1, wherein the pipes are made of a metallic braid and an inside coating of a polymer.

3. The device according to claim 1, wherein the pipes are provided with sealing bellows penetrating said ducts.

\* \* \* \* \*